United States Patent
Paris et al.

(10) Patent No.: US 10,444,958 B2
(45) Date of Patent: Oct. 15, 2019

(54) VISUAL EXAMPLE-BASED USER INTERFACE FOR ADJUSTING PHOTOS ALONG TWO DIMENSIONS

(71) Applicant: ADOBE INC., San Jose, CA (US)

(72) Inventors: Sylvain Paris, Jamaica Plain, MA (US); Durga Ganesh Grandhi, Vizianagaram (IN); Srinivasa Madhava Phaneendra Angara, Noida (IN); Robert Land Gager, Cupertino, CA (US); Sharad Baliyan, Ahmedabad (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/034,259

(22) Filed: Sep. 23, 2013

(65) Prior Publication Data

US 2015/0089444 A1   Mar. 26, 2015

(51) Int. Cl.
G06F 3/0484  (2013.01)
G06F 3/0481  (2013.01)

(52) U.S. Cl.
CPC .................. G06F 3/04845 (2013.01)

(58) Field of Classification Search
CPC ......... H02P 6/34; G06F 3/0482; G06F 3/0481
See application file for complete search history.

(56) References Cited

U.S. PATENT DOCUMENTS

| | | | |
|---|---|---|---|
| 7,516,417 B2 | 4/2009 | Amador et al. | |
| 8,103,094 B2 | 1/2012 | Wilensky | |
| 8,214,766 B1 * | 7/2012 | Berger | G06F 3/04845 715/822 |
| 9,195,909 B2 | 11/2015 | Paris | |
| 9,361,666 B2 | 6/2016 | Paris et al. | |
| 2007/0177779 A1 | 8/2007 | Dennison | |
| 2011/0113361 A1 * | 5/2011 | Bhatt | G06F 3/04847 715/781 |
| 2012/0054686 A1 * | 3/2012 | Joo | G06F 3/04886 715/835 |

(Continued)

OTHER PUBLICATIONS

LoCascio, Ted. My Adobe Photoshop Lightroom 4. Que Publishing, 2012.*

(Continued)

*Primary Examiner* — Rayeez R Chowdhury
(74) *Attorney, Agent, or Firm* — Shook, Hardy & Bacon, L.L.P.

(57) ABSTRACT

In various example embodiments, a system and method for providing a visual example-based user interface for adjusting images is provided. In example embodiments, a new image to be adjusted is received. A plurality of basis styles is generated by applying adjustment parameters to the new image. Each of the plurality of basis styles comprises an adjusted version of the new image with an adjustment of at least one image control. A user interface is provided that positions a version of the new image in a center portion and positions the plurality of basis styles on the user interface based on the adjustment parameters applied to the new image. A control mechanism is provided over the version of the new image whereby movement of the control mechanism to a new position on the user interface causes the version of the new image to adjust accordingly.

13 Claims, 7 Drawing Sheets

(56) References Cited

U.S. PATENT DOCUMENTS

| | | | |
|---|---|---|---|
| 2012/0106848 A1 | 5/2012 | Greig et al. | |
| 2013/0235069 A1* | 9/2013 | Ubillos | G09G 5/026 345/594 |
| 2014/0071148 A1* | 3/2014 | Webb | G06T 11/001 345/582 |
| 2014/0355821 A1 | 12/2014 | Solem et al. | |

OTHER PUBLICATIONS

Evening, Martin. The Adobe Photoshop Lightroom 4 Book: The Complete Guide for Photographers. Adobe Press, 2012.*
Author Unknown, "PhotoImpacte® XL User Guide", Ulead Systems, Inc., Aug. 2003.*
Photo Impact XL, Aug. 2003, Ulead System.*
First Action Interview Preinterview Communication dated Mar. 17, 2015 in U.S. Appl. No. 14/034,194, 5 pages.
First Action Interview Office Action dated May 28, 2015 in U.S. Appl. No. 14/034,194, 5 pages.
Notice of Allowance dated Jul. 17, 2015 in U.S. Appl. No. 14/034,194, 11 pages/ (no new refs).
First Action Interview Preinterview Communication dated Sep. 10, 2015 in U.S. Appl. No. 14/047,735, 5 pages.
First Action Interview Office Action dated Oct. 15, 2015 in U.S. Appl. No. 14/047,735, 8 pages.
Non-Final Office Action dated Sep. 23, 2016 in U.S. Appl. No. 14/876,223, 11 pages.
Notice of Allowance dated Feb. 10, 2016 in U.S. Appl. No. 14/047,735, 8 pages.
Notice of Allowance dated Apr. 20, 2017 in U.S. Appl. No. 14/876,223, 8 pages.
Preinterview first office action dated Oct. 30, 2017 in U.S. Appl. No. 15/154,796. 4 pages.
First action interview—office action dated Dec. 13, 2017 in U.S. Appl. No. 15/154,796. 5 pages.
Weinmann, E., & Lourekas, P. (2001). Recolor. In Photoshop 6 for Windows and Macintosh: Visual QuickStart Guide (pp.354-400). San Francisco, CA: Peachpit Press.
Final Office Action dated Feb. 1, 2018 in U.S. Appl. No. 15/154,796. 5 pages.
Notice of Allowance dated Jul. 20, 2018 in U.S. Appl. No. 15/154,796, 8 pages.

* cited by examiner

VISUAL EXAMPLE-BASED USER INTERFACE FOR ADJUSTING PHOTOS ALONG TWO DIMENSIONS

FIELD

The present disclosure relates generally to image processing, and in a specific example embodiment, to providing an example-based user interface for adjusting photos along two dimensions.

BACKGROUND

Conventionally, user interfaces for adjusting photos are typically based on sliders. When there are two adjustment axes, some variants may use a two-dimensional representation with a single control or multiple sliders. These approaches depend on a user having a mental model of how adjustments will affect the image.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that exemplify illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide system and methods providing an example-based user interface for adjusting photos along two dimensions. In example embodiments, a new image to be adjusted is received. A plurality of basis styles is generated by applying adjustment parameters to the new image. Each of the plurality of basis styles comprises an adjusted version of the new image with an adjustment of at least one image control. A user interface is provided that positions a version of the new image in a center portion and positions the plurality of basis styles on the user interface based on the adjustment parameters applied to the new image. A control mechanism is provided over the version of the new image whereby movement of the control mechanism to a new position on the user interface causes the version of the new image to adjust accordingly.

Figure 1:
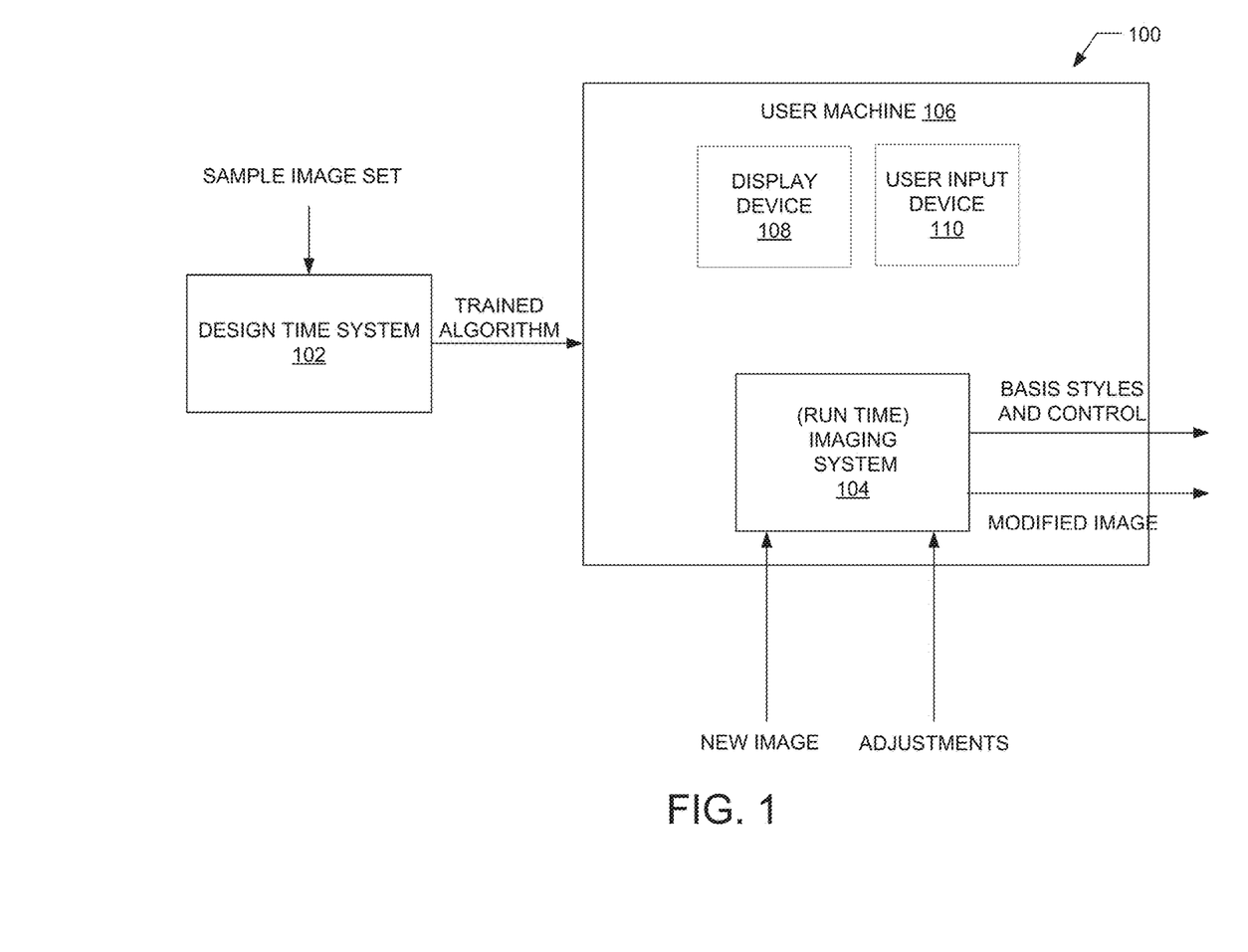
FIG. 1 is a block diagram of an example environment in which embodiments of the present invention may be utilized.

With reference to FIG. 1, an example environment 100 in which embodiments of the present invention may be utilized is shown. A design time system 102 generates a plurality of machine-learned data based on a sample image set. For example, the sample set may comprise a large number of sample images (e.g., 250 images) that are each adjusted by hand to provide "extreme" adjusted versions as well as a "good" version (e.g., from the perspective of a professional photographer) of the image. For instance, each image may be adjusted to provide versions having the lowest contrast, brightness, sharpness, or saturation as well as corresponding versions having highest contrast, brightness, sharpness, or saturation. If the design time system 102 desires to train an algorithm for a two-dimensional adjustment (e.g., involving two different image controls), the samples may include extreme versions of these combinations of image controls. For example, each sample may be adjusted to provide a lowest brightness/lowest contrast version, a lowest brightness/highest contrast version, a highest brightness/lowest contrast version, and a highest brightness/highest contrast version. It is contemplated that the image controls may be combined in any combination and corresponding versions of "extreme" sample images based on the combinations of the combined image controls used to train the algorithm in the design time system 102.

Each of these different versions of each sample image are provided to the design time system 102 and used to "train" an image adjustment algorithm such that the image adjustment algorithm can later on, for example, automatically generate "extreme" and "good" versions of new images based on what it has learned from the sample set of images. In other embodiments, the image adjustment algorithm may be trained to automatically generate versions of the new images that are not at the "extremes" (e.g., not at the lowest or highest image control value).

In the process of training the image adjustment algorithm, example embodiments determine image descriptors for each sample image. Image descriptors comprise a list of salient features of each sample image that are a summary of image features of each sample image. Examples of image features may include tonal information, color tone, number of faces, orientation of the image, or any other attributes that would assist in distinguishing one image from another image. These image descriptors are typically computed in a same manner. For instance, an element of an image descriptor is an average image brightness and another element of an image descriptor may be a number of faces detected in the image (e.g., using a face detection algorithm).

Once the design time system 102 completes training the algorithm, the trained algorithm and the machine-learned data may be stored to, accessed by, or associated with, a (runtime) imaging system 104 in a user machine 106. The learned data may comprise the set of reference images (also referred to as "reference dataset") along with data corresponding to the "extreme" versions and the "good" version of each sample image (also referred to as "reference image"). The "good" version of a sample image may be, for example, a version adjusted to what a professional photographer would consider ideal for the sample image. The data corresponding to the different versions includes adjustment parameters used to adjust the sample image to each of the different versions. In example embodiments, the trained algorithm may be transferred to the user machine 106 via a network (e.g., Internet, wide-area network, local area network) or using a tangible machine-readable storage device (e.g., CD-ROM).

In example embodiments, the imaging system 104 is configured to receive a new image from a user or operator of the user machine 106 and to apply the trained algorithm to the new image to provide basis styles of the new image to the user. Basis styles are versions of the new image using reference adjustments that are based on learned data (e.g., the adjustments made to the reference dataset). These basis styles are generated by the imaging system 104 based on content (e.g., new image descriptors) of the new image. Thus, two different new images will each result in different basis styles or reference points. The process for generating the basis styles will be discussed in more detail below. It is noted that the terms "basis style" and "reference point" may be used interchangeably.

In one embodiment, the basis styles comprise "extreme" versions of the new image that the user can view and, in some cases, select an adjustment from or in between. For example, the basis styles for a new image may be versions of the image with lowest brightness and lowest contrast, lowest brightness and highest contrast, highest brightness and lowest contrast, and highest brightness and highest contrast. Additionally, a control mechanism may be presented to the user on a display device 108 along with the basis styles so that the user may select or adjust between the basis styles using a user input device 110. The control mechanism may comprise, for example, a multi-directional control knob or a plurality of sliders. These adjustments may be received by the imaging system 104 and a modified version of the image generated and presented. The user interface will be discussed in further detail below.

In some embodiments, the imaging system 104 applies user preferences learned from past adjustments performed by a user of the user machine 106 to images similar to the new image to generate a user style (e.g., a version of the new image with adjustments based on user preferences applied) that is presented on the user interface. For example, if the user prefers to have portraits at a brightness of 60 and contrast at 40, the imaging system 104 may automatically adjust a new image that is identified to be a portrait (based on image descriptors) to these values of the image controls.

The user machine 106 may comprise a mobile phone, laptop, tablet, or any other communication device (e.g., mobile device) that a user may utilize to view and adjust images such as photographs. While only one user machine 106 is shown in FIG. 1, it is noted that any number of user machines 106 of different users may be present in the environment 100. It is further noted that while example embodiments may discuss images in terms of photographs or pictures, example embodiments may be used to define controls for any type of image data.

Figure 2:
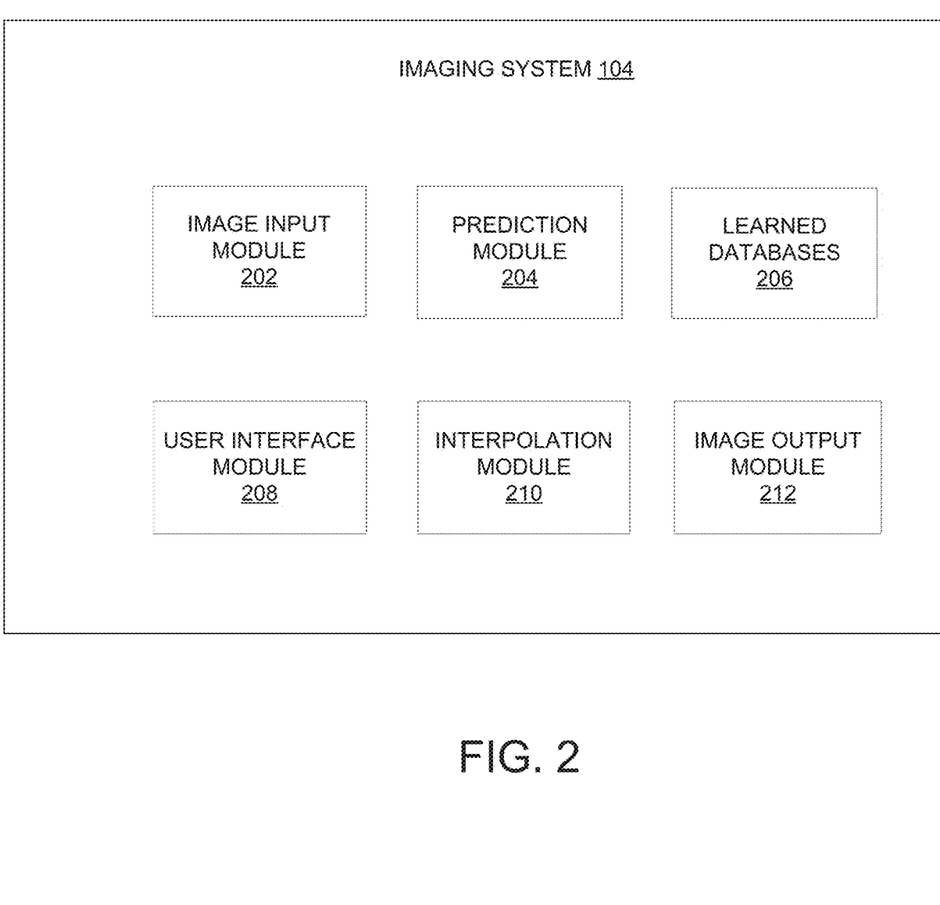
FIG. 2 is a block diagram illustrating an example embodiment of an imaging system.

Referring now to FIG. 2, the example imaging system 104 is shown in more detail. The imaging system 104 provides a user interface that includes controls for image adjustments of new images. To enable this process, the imaging system 104 may comprise an image input module 202, a prediction module 204, learned databases 206, a user interface module 208, an interpolation module 210, and an image output module 212 coupled in communication.

The image input module 202 receives the new image that is to be adjusted. In some cases, the new image may be accessed from an image capture device (e.g., a camera). Alternatively, the new image may be accessed from a storage device (not shown) on, or coupled to, the user machine 106.

Upon the user activating the imaging system 104 to adjust the new image, the prediction module 204 analyzes the new image and proposes a plurality of adjustments for the new image in a form of adjusted versions of the new image referred to as basis styles. In one embodiment, the prediction module 204 determines new image descriptors for the new image. Using the new image descriptors, the prediction module 204 accesses the learned databases 206 to compare the new image descriptors to image descriptors of reference images in the reference dataset. Thus, the learned database 206 may comprise a reference set database. Each reference image is assigned a weight that represents how similar the reference image is to the new image based on the comparison of the image descriptors. For example, the new image descriptors may indicate that the new image is of a sunset, and the reference images that are also sunsets are assigned a higher weight representing a stronger similarity. This weight may be applied to the adjustment parameters of each reference image.

In example embodiments, the prediction module 204 may determine how similar each reference image is by examining a reference dataset and ranking the reference images in the reference dataset based on a comparison of the image descriptors (e.g., how many or how close the image descriptors of the reference image matches the new image descriptors). As such, the reference images may be ranked/weighted between a value of zero (e.g., not related at all to the new image) to one (e.g., completely related to the new image). In other embodiments, some image descriptors may be more important than other image descriptors and the ranking of the reference images may be adjusted or weighted accordingly In an alternative embodiment, the reference image having the closest set of image descriptors to those of the new image descriptors is determined to be a most similar image. For example, the new image descriptors may indicate that the new image is of a sunset and the reference image determined to be the most similar may also be a sunset. Once the most similar reference image is determined, the adjustment parameters (e.g., correction curve) applied to the reference image may be similarly applied to the new image to generate a plurality of basis styles.

In yet another alternative embodiment, the image adjustments (e.g., brightness adjustment) are fixed. That is, the image adjustments for a particular image are predetermined for the new image regardless of its content. As such, the basis styles may be based on fixed adjustment parameters that do not consider the content of the new image. In this case, the learned data for the reference dataset as well as analysis of the new image for image descriptors may not be needed.

In some embodiments, the basis styles may be based on any number of image control adjustments by the prediction module 204. For example, the user may be allowed to adjust a combination of both the contrast and brightness using at least four basis styles (e.g., four "extreme" versions of the new image including one reference point for each combination of lowest and highest versions of the image control). In another example, the user may be allowed to adjust a combination of three image controls (e.g., contrast, brightness, and sharpness) using at least eight basis styles (e.g., one reference point for each combination of lowest and highest versions of the image control). For simplicity, example embodiments will be discussed herein using a combination of two image controls: brightness and contrast. However, it is contemplated that any number of one or more image controls of any image control type are applicable to example embodiments. An example process for generating and presenting the basis styles will be discussed in more detail in connection with FIG. 4 below.

In some embodiments, the data corresponding to each reference image may include adjustment parameters for "extreme" versions of each reference image and user adjustment parameters based on user preferences. In other embodiments, the user preference data (e.g., user adjustment parameters) may be stored and accessed separately from the reference image data. Thus in some embodiments, the prediction module 204 or a user preference module (not shown) uses the user adjustment parameters to adjust the new image to what the imaging system 104 believes is a user preferred version of the new image (e.g., user style).

The user interface module 208 provides a user interface on which the basis styles along with a version of the new image (e.g., a user style, a good style, or the new image itself) may be presented to the user. In one embodiment, the basis styles of the new image with various combinations of low and high brightness and contrast may be presented overlaid over a version of the new image positioned in a center position on the user interface. The user interface module 208 also provides a control mechanism on the user interface that a user may manipulate in order to adjust the version of the new image to their liking. The user interface will be discussed in more detail in connection with FIG. 3A The interpolation module 210 receives the adjustment indicated using the control mechanism and adjusts the new image accordingly (e.g., generates a new version of the new image that may be referred to as an "adjusted style"). As discussed above, the prediction module 204 may generate at least four basis styles for the different combinations of adjustments made to contrast and brightness. In order to determine the adjusted style or reference point between the basis styles and/or the version of the new image, the interpolation module 210 interpolates between these styles. For example, if the basis styles correspond to reference points that are 0 and 100 (e.g., in terms of brightness), then the interpolation module 210 may interpolate between the styles to determine an adjusted reference point of, for example, 40 (e.g., in terms of brightness).

It is contemplated that the basis styles do not need to be the "extremes" of the image control. For example, the basis styles may be at 20 and 80 for an image control. In these embodiments, the interpolation module 210 may extrapolate using the two basis styles. For example, if the basis styles are 20 and 80 for an image control, the interpolation module 210 may extrapolate to obtain an adjusted reference point at 10.

It is also contemplated that any two or more basis styles may be generated by the prediction module 204. For example, the prediction module 204 may generate a lowest, highest, and middle adjustment parameter basis styles for the new image. Using more basis styles may provide a more precise adjustment when interpolating or extrapolating to obtain an adjusted reference point or style.

The image output module 212 outputs a final image to the user. In some embodiments, the user may continually adjust the new image until they arrive at a final image to their liking. The user may then indicate (e.g., selecting an "OK" button) that the final image is approved. The image output module 212 may save this final image (e.g., to a local or coupled storage device) and provide a clean full screen version of the final image to a display device 108 of the user machine 106 (e.g., remove the basis styles from the user interface).

Figure 3A:
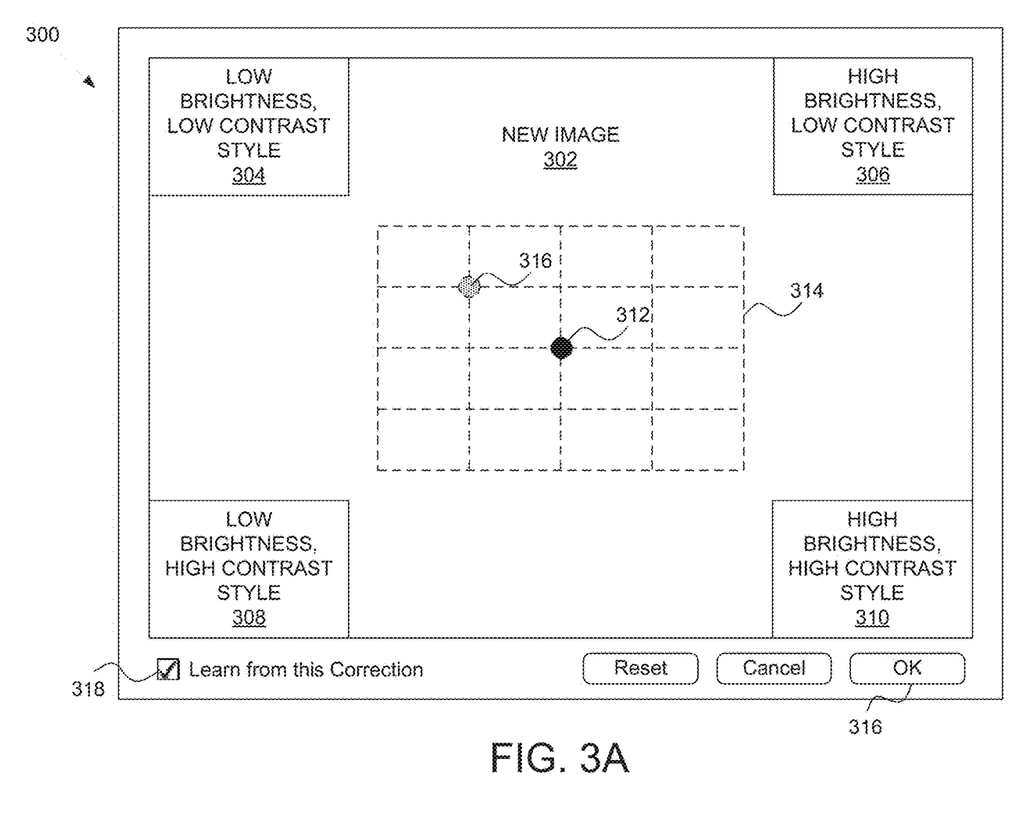
FIG. 3A is an example user interface for adjusting an image.

FIG. 3A is an example user interface 300 for adjusting an image. A version of the new image 302 (e.g., a user style based on user preferences, a good style based on a good version of a reference image, or the new image itself) is presented in a center portion of the user interface 300. Each of the basis styles 304-310, which may be shown as thumbnails having extreme possible states of the image, are overlaid over corners (or a plurality of edges of the user interface) of the version of the new image 302 according to their respective image control adjustments. For instance, brightness increases from left to right and contrast decreases from a bottom of the user interface 300 to a top of the user interface 300. As such, the basis style 304 with low brightness and low contrast is positioned in a top left corner of the user interface 300, while the basis style 310 for high brightness and high contrast is positioned in the bottom right corner of the user interface 300. It is noted that in one-dimensional embodiments using a single control image (e.g., brightness), the basis style may be positioned on two edges of the user interface 300 (e.g., left side and right side).

In one embodiment, the basis styles 304-310 are presented in a basis style coordinate system. As such, style corrections may be derived from a linear combination of the basis styles 304-310. Each point (x,y) in the basis style coordinate system represents a new style of correction which is a linear combination of the basis styles 304-310. It is noted that the basis styles 304-310 do not need to be extremes of the image controls. In these cases, the basis styles 304-310 may be positioned according to the adjustment parameters applied to the new image to generate the basis style. For example, if the adjustment parameter indicates a brightness of 20 and a contrast of 20, then the corresponding basis style may be positioned approximately 20% from a top edge and 20% from a left edge of the user interface 300.

A control mechanism 312 is provided over the version of the new image 302 in the user interface 300. The control mechanism's location on the user interface 300 may represent a current set of correction parameters or adjustment parameters applied to the version of the new image 302. The control mechanism 312 may be moved around to fine tune or adjust the version of the new image 302. The basis styles 304-310 visually indicate a correction that the user will obtain if the user drags the control mechanism 312 in a particular direction towards one of the basis styles 304-310. Thus, the basis styles 304-310 provide a visual guide when the user is adjusting the version of the new image 302. In one embodiment, the basis styles 304-310 may disappear when the user moves the control mechanism 312 in order to allow the user to see the entire new version of the new image 302.

In one embodiment, a grid 314 may be superimposed over the version of the new image 302. The grid 314 provides a visual guide as to how far the control mechanism 312 may be moved when adjusting the new image 302. For example, in order to adjust the new image 302 to an extreme of low brightness and low contrast, the control mechanism 312 is moved to a top left corner of the grid 314. Additionally, the grid 314 may provide guidance when trying to adjust the new image 312 between increments of the basis styles 304-310. In the example of FIG. 3A, the grid 314 is broken down into 25% increments. Thus, moving the control mechanism 312 to a position 316 on the grid 314 will adjust the new image 302 to a brightness of 25 and a contrast of 25. It is noted that the grid 314 may provide guidelines at other increments. Additionally, a size of the grid 314 may be any size on the user interface 300. For example, the grid 314 may be an entire size of the user interface 300.

In an embodiment where the imaging system 104 learns and updates user preferences, a checkbox 318 may be provided that instructs the imaging system 104 to learn from the present user adjustment to the new image 302. As such, when the user finalizes a position of the control mechanism 312 on the user interface 300 and selects an approval button 316 (e.g., "OK" button) to approve the new image 302, the present user adjustment is stored to the learned databases 206 and used to update the user preference data in the learned databases 206.

Figure 3B:
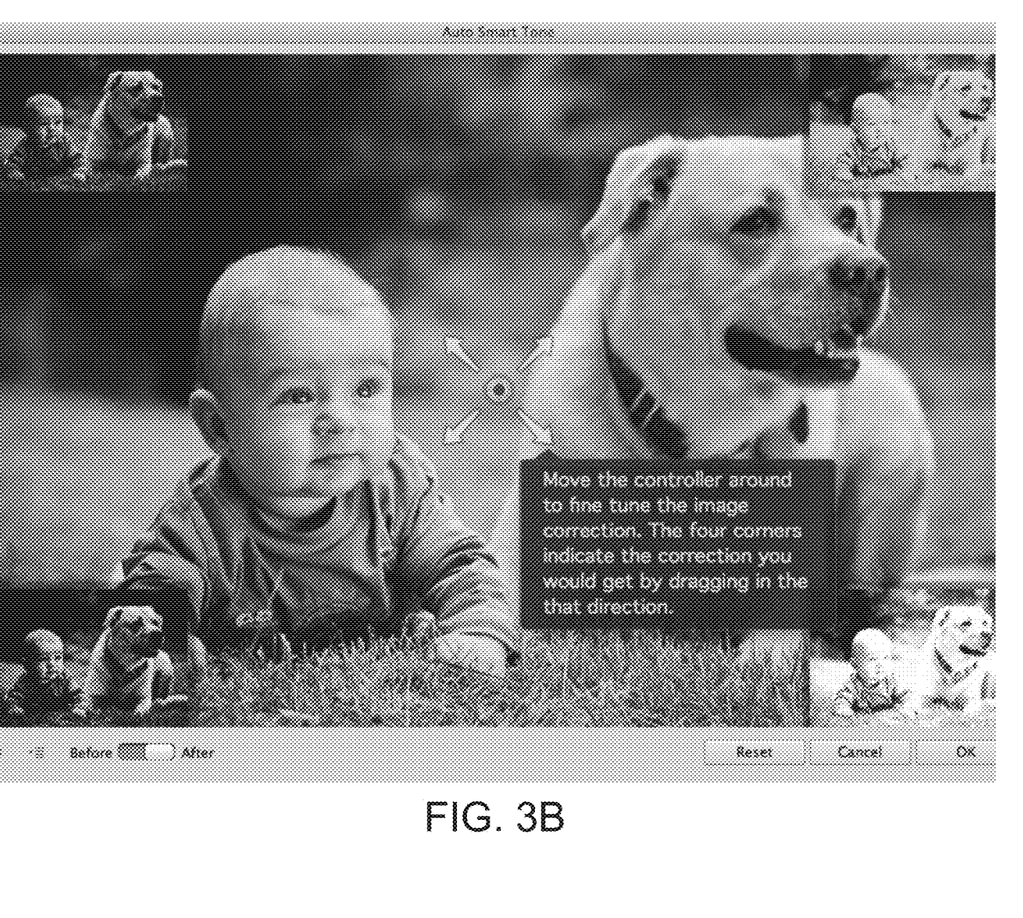
FIG. 3B is an example screenshot of a user interface for adjusting an image.

FIG. 3B is an example screenshot of a user interface for adjusting an image. A version of the new image is presented in a center portion of the user interface. Each of the basis styles, which are shown as thumbnails having extreme possible states of the image, are overlaid over corners of the version of the new image according to their respective image control adjustments. For instance, brightness increases from left to right and contrast decreases from a bottom of the user interface to a top of the user interface. As such, the basis style with low brightness and low contrast is positioned in a top left corner of the user interface, while the basis style for high brightness and high contrast is positioned in the bottom right corner of the user interface.

Figure 4:
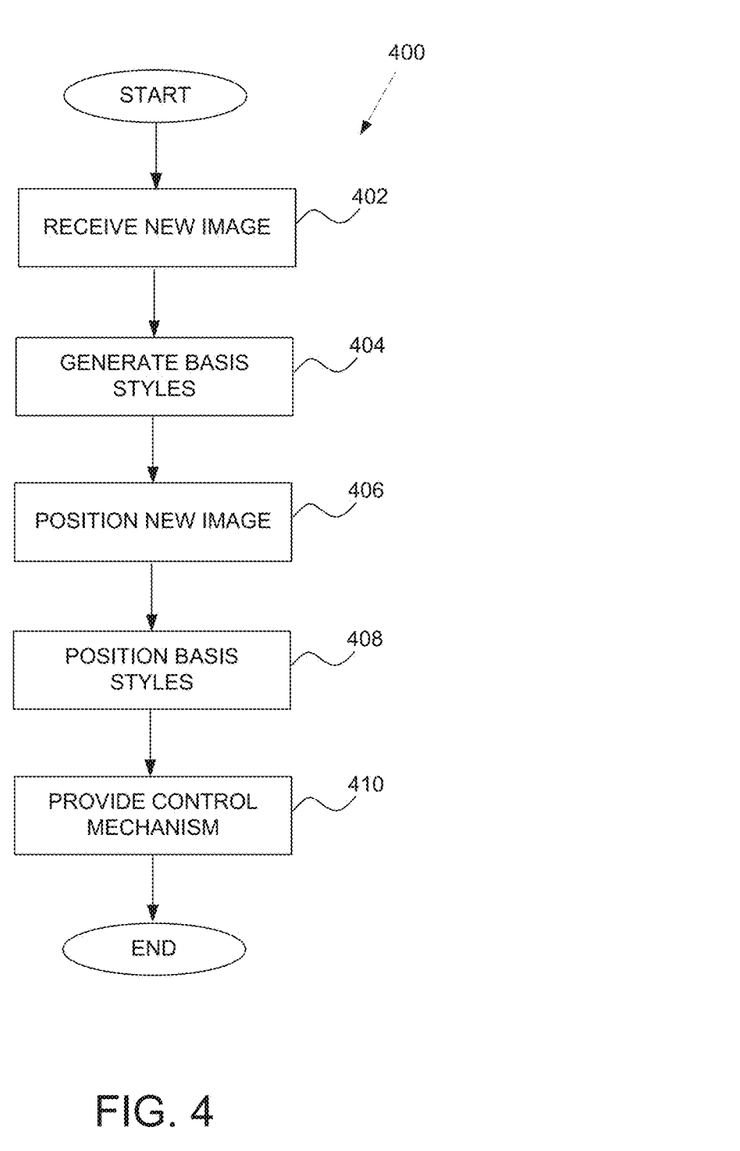
FIG. 4 is a flow diagram of an example high-level method for providing a user interface for adjusting an image along two dimensions.

FIG. 4 is a flow diagram of an example high-level method for providing a user interface (e.g., user interface 300) for adjusting an image along two dimensions. Accordingly, a user may provide one or more images (referred to as "new images") to the imaging system 104 for adjustment. The images are "new" in the sense that the imaging system 104 has never "seen" the images before. In operation 402, the imaging system 104 receives a new image to be adjusted. As such, the image input module 202 may be coupled to a camera or a storage device and accesses/receives the new image.

In operation 404, basis styles are generated for the new image. In one embodiments, each basis style may be a version of the new image based on predetermined, generic image control adjustments that do not take the content of the new image into consideration. In other embodiments, the content of the new image may be considered when generating the basis style.

In example embodiments, image descriptors (e.g., position of average pixel, ISO settings, number of faces, color tone, etc.) are determined for the new image by the prediction module 204 of the new image. Using the new image descriptors, the prediction module 204 weighs the learned data. In example embodiments, the prediction module 204 accesses the learned database 206 to compare the new image descriptors to image descriptors of the reference dataset. In one embodiment, each reference image in the reference dataset is assigned a weight representing how similar the reference image is to the new image. In alternative embodiments, other mechanisms may be used to compare the new image and the reference dataset to determine the reference image that is most similar to the new image (e.g., selecting a reference image having the closest set of image descriptors to those of the new image descriptors).

Once the weight of each reference image in the reference dataset is determined, a weighted average of the adjustment parameters applied to the reference images (based on the weight applied to each reference image) may be similarly applied to the new image in operation 408. For example, the weighted averages of the adjustment parameters corresponding to the extreme versions of the reference images may be applied to the new image to generate extreme versions of the new image (e.g., basis styles of the new image). Similarly, a weighted average of adjustment parameters used to generate the good version of the reference image may be applied to the new image to generate a good version of the new image (e.g., a good style of the new image).

In operation 406, a version of the new image is positioned in a center portion of a user interface. In one case, the center portion may comprise an entire image display area of the user interface. The version of the new image may be an original version of the new image. Alternatively, the version of the new image may be the "good" version (also referred to as "good style") based on weighted average of adjustment parameters that provided a "good" version of each reference image.

Further still, the version of the new image may comprise a user preference version of the new image (also referred to as "user style") that is based on past user image adjustments made by the user. In this embodiment, the new image descriptors are used to find and weigh user sample images and their corresponding correction parameters in the user style database. If the user has made user adjustments in the past for new images that were adjusted, these user adjustments (e.g., correction parameters) may be stored along with image descriptors of the previous new images (referred to as "user sample images"). In one embodiment, a covariance function may be used to estimate the new image's relationship to every sample image in the user style database. This comparison provides a covariance vector, which may be multiplied by an inverse of a covariance matrix to obtain a set of weights. There is one weight for each user sample image of the sample dataset: zero means the sample image is unrelated and one means the sample image is highly related to the new image. The user style may be generated using the weighted user adjustments (e.g., weighted based on the weight assigned based on the image descriptors).

In operation 408, the basis styles are positioned on the user interface by the user interface module 208. In one example, the basis styles are thumbnails of the extreme versions of the new image that are overlaid over corners of the version of the new image according to their respective image control adjustments. Thus, a basis style with low brightness and low contrast is positioned in a top left corner of the user interface, while a basis style for high brightness and high contrast is positioned in the bottom right corner of the user interface as shown in FIG. 3A.

In operation 410, a control mechanism is provided on the user interface. The control mechanism's location on the user interface may represent a current set of correction parameters or adjustment parameters applied to the version of the new image. Thus, the control mechanism may be centered on the user interface if no adjustments are made or the adjustments correspond to 50/50 for the combination of image controls. In some embodiments, a grid may also be superimposed over the version of the new image 302 to provide a visual guide for moving the control mechanism.

Figure 5:
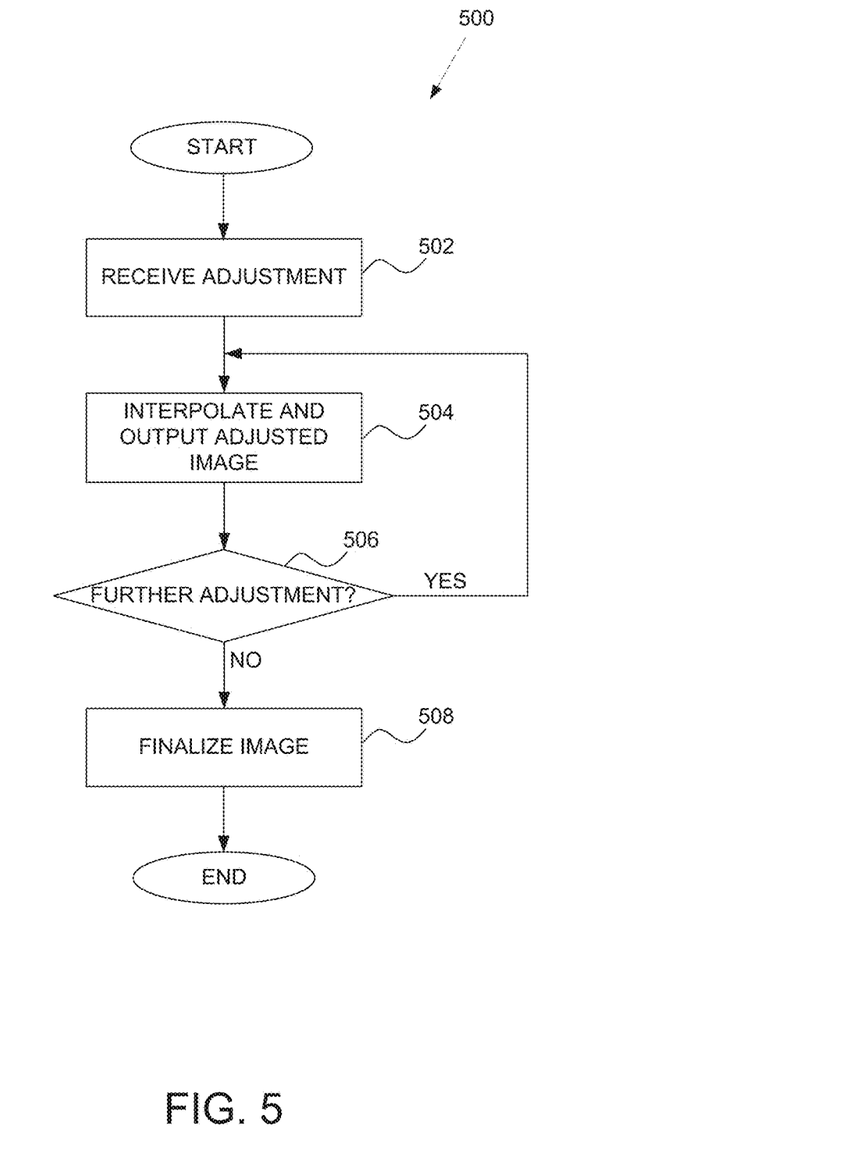
FIG. 5 is a flow diagram of an example high-level method for revising a new image using the user interface.

FIG. 5 is a flow diagram of an example high-level method 500 for revising a new image using the user interface (e.g., user interface 300). When the user moves the control mechanism 312 to a new position, the position information may be captured by the user interface module 208. The position information may then be provided to the interpolation module 210.

In operation 504, the interpolation module 210 interpolates using at least two styles (e.g., the basis styles 304-310) and/or the version of the new image to determine an adjusted style (e.g., adjusted version of new image) to output. For example, if the basis styles 304-310 correspond to extremes of 0 and 100 for the various combinations of image controls, then the interpolation module 210 may interpolate between the styles 304-310 to determine an adjusted image or reference point of, for example, 40 brightness and 60 contrast. It is contemplated that the basis styles 304-310 do not need to be the "extremes" of the image control, and the interpolation module 210 may extrapolate using two of the basis styles. The adjusted reference point or style may then be output on the user interface 300.

In operation 506, a determination is made as to whether further adjustments are made. It is noted that the refining of the new image and/or the adjusted style may occur substantially in real time. That is, as the user is moving the control mechanism 312 around the user interface 300, the adjusted style may be updated in the center portion of the user interface 300. This occurs as the interpolation module 210 continuously interpolates (or extrapolates) using at least two styles 304-310 and/or a current version of the new image.

If no further adjustments are made and the user approves the adjusted style, then in operation 508, the image is finalized. In one embodiment, the user interface 300 will be updated to remove the basis styles 304-310 and only show the finalized new image. In embodiments that utilizes user preferences, the learned databases 206 (e.g., user style database) may be updated with the new user adjustment (e.g., control parameter) as well as image descriptor for the new image.

While example embodiments discuss the use of image descriptors to identify the images, it is noted that other mechanisms may be used. For example, a snapshot of the new image may be captured and stored to identify the new image. However, storing these snapshots may be difficult as more and more adjustments are made. By using image descriptors, less dimensional space is needed for storage of the image. Additionally, a Euclidean distance between two image descriptors provides a good measure of similarity between their corresponding images. The smaller a distance, the more similar the images are to each other. Since an image descriptor contains only the salient information of the image, doing away with unimportant parts of it, this may give a measure of similarity better than image-to-image comparison.

Figure 6:
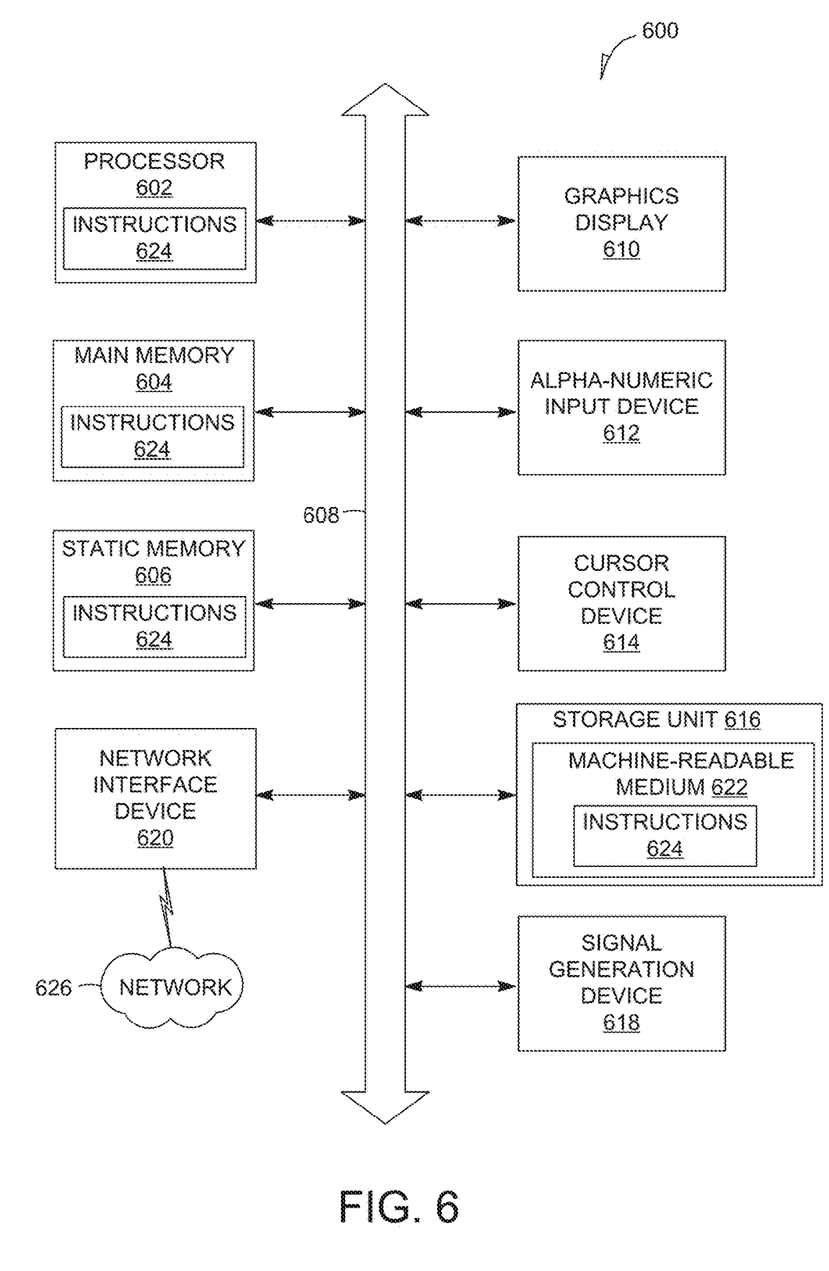
FIG. 6 is a simplified block diagram of a machine in an example form of a computing system within which a set of instructions for causing the machine to perform any one or more of the methodologies discussed herein may be executed.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system and within which instructions 624 (e.g., software, a program, an application, an applet, an app, or other executable code) for causing the machine 600 to perform any one or more of the methodologies discussed herein may be executed. In alternative embodiments, the machine 600 operates as a stand-alone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The machine 600 may further include a graphics display 610 (e.g., a plasma display panel (PDP), a light emitting diode (LED) display, a liquid crystal display (LCD), a projector, or a cathode ray tube (CRT)). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a speaker), and a network interface device 620.

The storage unit 616 includes a tangible machine-readable medium 622 on which is stored the instructions 624 embodying any one or more of the methodologies or functions described herein. The instructions 624 may also reside, completely or at least partially, within the main memory 604, within the processor 602 (e.g., within the processor's cache memory), or both, during execution thereof by the machine 600. Accordingly, the main memory 604 and the processor 602 may be considered as machine-readable media. The instructions 624 may be transmitted or received over a network 626 via the network interface device 620.

As used herein, the term "memory" refers to a tangible machine-readable medium able to store data temporarily or permanently and may be taken to include, but not be limited to, random-access memory (RAM), read-only memory (ROM), buffer memory, flash memory, and cache memory. While the tangible machine-readable medium 622 is shown in an example embodiment to be a single medium, the term "tangible machine-readable medium" should be taken to include a single medium or multiple media (e.g., a centralized or distributed database, or associated caches and servers) able to store instructions. The term "tangible machine-readable medium" shall also be taken to include any medium, or combination of multiple media, that is capable of storing instructions (e.g., instructions 624) for execution by a machine (e.g., machine 600), such that the instructions, when executed by one or more processors of the machine (e.g., processor 602), cause the machine to perform any one or more of the methodologies described herein. Accordingly, a "tangible machine-readable medium" may refer to a single storage apparatus or device, as well as "cloud-based" storage systems or storage networks that include multiple storage apparatus or devices. The term "tangible machine-readable medium" shall accordingly be taken to include, but not be limited to, one or more data repositories in the form of a solid-state memory, an optical medium, a magnetic medium, or any suitable combination thereof. Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 624 may further be transmitted or received over a communications network 626 using a transmission medium via the network interface device 620 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method, comprising:
   receiving a new image to be adjusted;
   providing aversion of the new image in a user interface as a displayed background image;
   generating, using a hardware processor, a plurality of basis styles by applying adjustment parameters to the new image, the plurality of basis styles including at least four basis styles that are adjusted versions of the new image;
   positioning, as four thumbnails, each of the four basis styles positioned at a different one of four corners of the user interface;
   providing a user interface object movable towards the four thumbnails, each thumbnail having a combination of at least two image controls, to adjust the version of the new image, wherein adjusting the version of the new image includes applying the combination of the at least two image controls associated with movement towards one of the four thumbnails having the one of the four basis styles;
   receiving a user adjustment to the version of the new image via a dragging movement of the user interface object on the user interface towards at least one of the four basis styles; interpolating or extrapolating an adjusted style based on a relative position of the user interface object with regard to the four basis styles, wherein the adjusted style of the displayed background image is reflected by a gradual changing of the displayed background image based on the dragging movement of the user interface object toward at least one of the four basis styles;
   applying the adjusted style to the displayed background image in real-time as the user adjustment is received via the dragging movement of the user interface object on the user interface; and
   displaying the adjusted style of the new image using the displayed background image.

2. The method of claim 1, wherein the combinations of the at least two image controls comprise respective adjustments of a first image control and respective adjustments of a second image control.

3. The method of claim 2, wherein the respective adjustments of the first image control and the respective adjustments of the second image control as applied to the four thumbnails as the one of the style basis further comprise:
   a first style basis with respective lowest adjustments of the first image control and lowest adjustments of the second image control,
   a second style basis with respective lowest adjustments of the first image control and highest adjustments of the second image control,
   a third style basis with respective highest adjustments of the first image control and lowest adjustments of the second image control, and
   a fourth style basis with respective highest adjustments of the first image control and highest adjustments of the second image control.

4. The method of claim 1, further comprising providing a learning indicator on the user interface, activation of the learning indicator instructing capture and storage of user adjustments, the user adjustments to be factored into future adjustments of another new image in response to the new image having a closest set of image descriptors, among a set of reference images, compared with the another new image.

5. The method of claim 1, wherein the displayed background image comprises a style that is based on a weighted average of adjustment parameters of a reference dataset.

6. The method of claim 1, further comprising:
   analyzing the new image to determine new image descriptors of the new image; and
   weighting reference images from a reference dataset by comparing the new image descriptors to image descriptors of each reference image, wherein the generating the plurality of basis styles occurs by applying weighted averages of adjustment parameters based on the weight determined for each reference image.

7. A non-transitory machine-readable medium storing instructions which, when executed by the at least one hardware processor of a machine, cause the machine to perform operations comprising:
   receiving a new image to be adjusted;
   providing aversion of the new image in a user interface as a displayed background image;
   generating a plurality of basis styles by applying adjustment parameters to the new image;
   positioning the displayed background image with at least four of the plurality of basis styles on the user interface, the four basis styles positioned as four thumbnails, each of the four thumbnails positioned at a different one of four corners of the displayed background image, wherein a style basis of each of the four thumbnails is a combination of at least two image controls;
   providing a user interface object movable towards the four thumbnails on the user interface;

receiving a user adjustment to the version of the new image via a dragging movement of the user interface object on the user interface towards at least one of the four thumbnails;

interpolating or extrapolating an adjusted style based on a relative position of the user interface object with regard to the four basis styles, wherein the adjusted style is reflected by a gradual changing of the displayed background image based on the dragging movement of the user interface object toward at least one of the four thumbnails; and applying the adjusted style to the displayed background image in real-time as the user adjustment is received via the dragging movement of the user interface object on the user interface.

8. The non-transitory machine-readable medium of claim 7, wherein the operations further comprise positioning a grid over the version of the new image to provide visual guidance for movement of the control mechanism, wherein a distance of the control mechanism moved on the grid towards the at least one of the four basis styles corresponds to a proportional adjustment of the version of the new image based on the at least one of the four basis styles.

9. The non-transitory machine-readable medium of claim 7, wherein the operations further comprise providing an approval indicator on the user interface, activation of the approval indicator finalizing at least two adjustments made to the version of the new image, the at least two adjustments being proportional to respective two similar adjustments made to the displayed background image based on the at least one of the four basis styles from the new image.

10. The non-transitory machine-readable medium of claim 7, wherein the operations further comprise providing a learning indicator on the user interface, activation of the learning indicator instructing capture and storage of user adjustments, the user adjustments to be factored into future adjustments of another new image in response to the new image having a closest set of image descriptors, among a set of reference images, compared with the another new image.

11. The non-transitory machine-readable medium of claim 7, wherein the four basis styles comprise versions of the new image with respective lowest and highest adjustments of the at least one image control.

12. A system comprising:
a hardware processor of a machine;
an image input module to receive a new image to be adjusted;
a user preference module to generate, using a hardware processor, a plurality of basis styles by applying adjustment parameters to the new image, the plurality of basis styles including at least four basis styles that are adjusted versions of the new image with extreme opposite adjustments of at least two image controls;
a user interface module to provide a user interface, the user interface positioning a further version of the new image as a displayed background image and positioning the four basis styles of the plurality of basis styles as four thumbnails, each of the four thumbnails positioned at a different one of four corners of the user interface, and to provide a user interface object in the user interface, the user interface object movable via a dragging movement towards at least one of the four thumbnails on the user interface to adjust the displayed background image, wherein the user interface module is further to receive a user adjustment indicated by the dragging movement of the user interface object on the user interface; and
an interpolation module, coupled to the user interface module, to interpolate or extrapolate based on the dragging movement towards the at least one of the four thumbnails to generate an adjusted style corresponding to the user adjustment, wherein the adjusted style is reflected by a gradual changing of the displayed background image based on the dragging movement of the user interface object toward at least one of the four thumbnails, wherein the adjusted style is based on a relative position of the user interface object with regard to the at least one of the four thumbnails.

13. The system of claim 12, wherein the user interface module is further to provide a learning indicator on the user interface, activation of the learning indicator instructing capture and storage of user adjustments, the user adjustments to be factored into future adjustments of another new image in response to the new image having a closest set of image descriptors, among a set of reference images, compared with the another new image.

* * * * *

UNITED STATES PATENT AND TRADEMARK OFFICE
CERTIFICATE OF CORRECTION

| | | |
|---|---|---|
| PATENT NO. | : 10,444,958 B2 | Page 1 of 1 |
| APPLICATION NO. | : 14/034259 | |
| DATED | : October 15, 2019 | |
| INVENTOR(S) | : Paris et al. | |

It is certified that error appears in the above-identified patent and that said Letters Patent is hereby corrected as shown below:

On the Title Page

On page 2, in Column 1, Other Publications, Line 3, delete ""PhotoImpacte®" and insert -- "PhotoImpact® --, therefor.

In the Claims

In Column 13, Line 43, Claim 1, delete "aversion" and insert -- a version --, therefor.

In Column 14, Line 55, Claim 7, delete "aversion" and insert -- a version --, therefor.

Signed and Sealed this
Fifth Day of May, 2020

Andrei Iancu
*Director of the United States Patent and Trademark Office*